(12) United States Patent
Lu

(10) Patent No.: US 11,152,007 B2
(45) Date of Patent: Oct. 19, 2021

(54) METHOD, AND DEVICE FOR MATCHING SPEECH WITH TEXT, AND COMPUTER-READABLE STORAGE MEDIUM

(71) Applicant: Baidu Online Network Technology (Beijing) Co., Ltd., Beijing (CN)

(72) Inventor: Yongshuai Lu, Beijing (CN)

(73) Assignee: Baidu Online Network Technology Co., Ltd., Beijing (CN)

(*) Notice: Subject to any disclaimer, the term of this patent is extended or adjusted under 35 U.S.C. 154(b) by 164 days.

(21) Appl. No.: 16/543,155

(22) Filed: Aug. 16, 2019

(65) Prior Publication Data

US 2020/0184978 A1 Jun. 11, 2020

(30) Foreign Application Priority Data

Dec. 7, 2018 (CN) .......................... 201811495921.4

(51) Int. Cl.
*G06F 40/10* (2020.01)
*G10L 17/14* (2013.01)
(Continued)

(52) U.S. Cl.
CPC ............ *G10L 17/14* (2013.01); *G10L 15/187* (2013.01); *G10L 17/02* (2013.01);
(Continued)

(58) Field of Classification Search
CPC .... G06F 16/3343; G06F 40/10; G06F 40/194; G06K 9/6215
See application file for complete search history.

(56) References Cited

U.S. PATENT DOCUMENTS 5,333,236 A     7/1994   Bahl et al.
5,649,060 A * 7/1997   Ellozy .................. G11B 27/028
                                                                           704/278
(Continued)

FOREIGN PATENT DOCUMENTS

CN        105426357 A     3/2016
CN        107016994 A     8/2017
(Continued)

OTHER PUBLICATIONS

H. C. Leung, V. W. Zue, "A Procedure For Automatic Alignment of Phonetic Transcriptions With Continuous Speech", Proceedings of ICASSP 84, pp. 2.7.1-2.7.3, 1984. (Year: 1984).*

(Continued)

*Primary Examiner* — Feng-Tzer Tzeng
(74) *Attorney, Agent, or Firm* — Knobbe, Martens, Olson & Bear, LLP (57) ABSTRACT

Embodiments of a method and device for matching a speech with a text, and a computer-readable storage medium are provided. The method can include: acquiring a speech identification text by identifying a received speech signal; comparing the speech identification text with multiple candidate texts in a first matching mode to determine a first matching text; and comparing phonetic symbols of the speech identification text with phonetic symbols of the multiple candidate texts in a second matching mode to determine a second matching text, in a case that no first matching text is determined.

9 Claims, 7 Drawing Sheets

(51) Int. Cl.
  *G10L 17/02* (2013.01)
  *G10L 15/187* (2013.01)
  *G06F 16/33* (2019.01)
  *G06F 40/194* (2020.01)
  *G06K 9/62* (2006.01)

(52) U.S. Cl.
  CPC .......... *G06F 16/3343* (2019.01); *G06F 40/10* (2020.01); *G06F 40/194* (2020.01); *G06K 9/6215* (2013.01)

(56) References Cited

U.S. PATENT DOCUMENTS 9,454,524 B1\* 9/2016 Modani ................ G06K 9/6247
2007/0156404 A1\* 7/2007 Lee .......................... G10L 13/08
 704/254
2012/0123768 A1\* 5/2012 Liu ....................... G06F 40/253
 704/9
2017/0061250 A1\* 3/2017 Gao ..................... G06N 3/0454

FOREIGN PATENT DOCUMENTS

CN 108509416 A 9/2018
CN 108628825 A 10/2018

OTHER PUBLICATIONS

Office Action dated Jul. 25, 2019, for Chinese Application No. 201811495921.4, 13 pages.
Search Report dated Jul. 16, 2019 for Chinese Application No. 201811495921.4, 4 pages.

\* cited by examiner

METHOD, AND DEVICE FOR MATCHING SPEECH WITH TEXT, AND COMPUTER-READABLE STORAGE MEDIUM

CROSS-REFERENCE TO RELATED APPLICATION

This application claims priority to Chinese patent application No. 201811495921.4, filed on Dec. 7, 2018, which is hereby incorporated by reference in its entirety.

TECHNICAL FIELD

The present application relates to a field of artificial intelligence technology, and in particular, to a method and device for matching a speech with a text, and a computer-readable storage medium.

BACKGROUND

With the development of speech technology, speech commands are automatically identified in more and more scenarios. For example, in some games, users can input speeches, so that the game characters execute certain game actions.

However, when a device matches a user's speech with a text, the user's corresponding intent is obtained from the user's speech by simple regular matching or rewriting, etc. When both matching and rewriting are not successful, the sentence such as "I can't understand, please say again." is usually returned from the device.

The Chinese language per se is vast and profound. In addition, accents of various regions are not completely the same, so even for the same sentence in different accents, the identification results may be completely different. Therefore, data obtained by regular matching or rewriting are very limited, which are difficult to be truly matched with an identification result. This will cause the device to continually ask the user what they want to do, so that fluency for speech interaction games and user's experience are not good.

SUMMARY

A method and device for matching a speech with a text and a computer-readable storage medium are provided according to embodiments of the present application, so as to at least solve the above technical problems in the existing technology.

According to a first aspect, a method for matching a speech with a text is provided according to an embodiment of the present application, including:

acquiring a speech identification text by identifying a received speech signal;

comparing the speech identification text with multiple candidate texts in a first matching mode to determine a first matching text; and comparing phonetic symbols of the speech identification text with phonetic symbols of the multiple candidate texts in a second matching mode to determine a second matching text, in a case that no first matching text is determined.

In one implementation, the method further includes:

outputting the first matching text as a matched candidate text, in a case that the first matching text is determined; and outputting the second matching text as the matched candidate text, in a case that the second matching text is determined.

In one implementation, the method further includes:

calculating a similarity between a sentence vector of the speech identification text and a sentence vector of each of the multiple candidate texts, in a case that no second matching text is determined; and outputting a candidate text with the largest similarity as a matched candidate text.

In one implementation, the comparing phonetic symbols of the speech identification text with phonetic symbols of the multiple candidate texts in a second matching mode to determine a second matching text includes:

converting the speech identification text into the phonetic symbols of the speech identification text and converting the multiple candidate texts into the phonetic symbols of the multiple candidate texts;

calculating a similarity between the phonetic symbols of the speech identification text and the phonetic symbols of each of the multiple candidate texts;

determining a candidate text with the largest similarity as a matched candidate text in a case that the largest similarity is larger than a set threshold; and outputting the matched candidate text.

In one implementation, the calculating a similarity between the phonetic symbols of the speech identification text and the phonetic symbols of each of the multiple candidate texts by a following formula:

$$\text{similarity} = \frac{LCS(s, q)}{len(s)},$$

where s represents phonetic symbols of one of the multiple candidate texts, q represents the phonetic symbols of the speech identification text, LCS(s, q) represents a length of the longest common sequence between the phonetic symbols of the one of the multiple candidate texts and the phonetic symbols of the speech identification text, len(s) represents a length of the phonetic symbols of the one of the multiple candidate texts.

In one implementation, the calculating a similarity between a sentence vector of the speech identification text and a sentence vector of each of the multiple candidate texts includes:

segmenting the speech identification text and the multiple candidate texts into words;

acquiring a word vector of each word;

adding word vectors of words of the speech identification text to obtain the sentence vector of the speech identification text, and adding word vectors of words of one of the multiple candidate texts to acquire a sentence vector of the one of the multiple candidate texts;

calculating a cosine similarity between the sentence vector of the speech identification text and the sentence vector of the one of the multiple candidate texts, as the similarity between the sentence vector of the speech identification text and the sentence vector of the one of the multiple candidate texts.

According to a second aspect, a device for matching a speech with a text is provided according to an embodiment of the present application, including:

an identifying module, configured to acquire a speech identification text by identifying a received speech signal;

a first matching module, configured to compare the speech identification text with multiple candidate texts in a first matching mode to determine a first matching text; and a second matching module, configured to comparing phonetic symbols of the speech identification text with phonetic symbols of the multiple candidate texts in a second matching mode to determine a second matching text, in a case that no first matching text is determined.

In one implementation, the device further includes:

an outputting module, configured to output the first matching text as a matched candidate text, in a case that the first matching text is determined; and output the second matching text as the matched candidate text, in a case that the second matching text is determined.

In one implementation, the device further includes:

a vector matching module, configured to calculate a similarity between a sentence vector of the speech identification text and a sentence vector of each of the multiple candidate texts, in a case that no second matching text is determined; and output a candidate text with the largest similarity as a matched candidate text.

In one implementation, the second matching module includes:

a converting sub-module, configured to convert the speech identification text into the phonetic symbols of the speech identification text and convert the multiple candidate texts into the phonetic symbols of the multiple candidate texts;

a phonetic similarity calculating sub-module, configured to calculate a similarity between the phonetic symbols of the speech identification text and the phonetic symbols of each of the multiple candidate texts;

a matching sub-module, configured to determine a candidate text with the largest similarity as a matched candidate text in a case that the largest similarity is larger than a set threshold; and output the matched candidate text.

In one implementation, the phonetic similarity calculating sub-module is configured to calculate a similarity between the phonetic symbols of the speech identification text and the phonetic symbols of each of the multiple candidate texts by a following formula:

$$similarity = \frac{LCS(s, q)}{len(s)},$$

where s represents phonetic symbols of one of the multiple candidate texts, q represents the phonetic symbols of the speech identification text, LCS(s, q) represents a length of the longest common sequence between the phonetic symbols of the one of the multiple candidate texts and the phonetic symbols of the speech identification text, len(s) represents a length of the phonetic symbols of the one of the multiple candidate texts.

In one implementation, the vector matching module includes:

a word segmentation sub-module, configured to segment the speech identification text and the multiple candidate texts into words;

a word vector acquiring sub-module, configured to acquire a word vector of each word;

a sentence vector acquiring sub-module, configured to add word vectors of words of the speech identification text to obtain the sentence vector of the speech identification text, and add word vectors of words of one of the multiple candidate texts to acquire a sentence vector of the one of the multiple candidate texts;

a vector similarity calculating sub-module, configured to calculate a cosine similarity between the sentence vector of the speech identification text and the sentence vector of the one of the multiple candidate texts, as the similarity between the sentence vector of the speech identification text and the sentence vector of the one of the multiple candidate texts.

In a third aspect, in a possible design, a device for matching a speech with a text includes a processor and a storage, the storage is configured to store a program for supporting the above method executed by the above device, the processor is configured to execute the program stored in the storage. The device further includes a communication interface configured for communication between the device and another apparatus or communication network.

In a fourth aspect, a computer-readable storage medium is provided for storing computer software instructions used by the above device, the computer software instructions include programs involved in execution of the above method.

In the embodiment of the present application, by performing exact matching and phonetic fuzzy matching in sequence, the matching speed can be accelerated, and the smoothness of the speech interaction process can be improved.

Further, the semantic similarity matching can be performed by the sentence vector matching in the case where the exact matching and the phonetic fuzzy matching fail, so that the true intention of the user can be more accurately matched.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain embodiments are briefly described. As those skilled in the art would realize, the described embodiments may be modified in various different ways, all without departing from the spirit or scope of the present application. Accordingly, the drawings and description are to be regarded as illustrative in nature and not restrictive.

A method and a device for matching a speech with a text are provided according to embodiments of the present application. The specific processing flow and principle of the method and device for matching a speech with a text according to an embodiment of the present application will be described in detail below.

Figure 1:
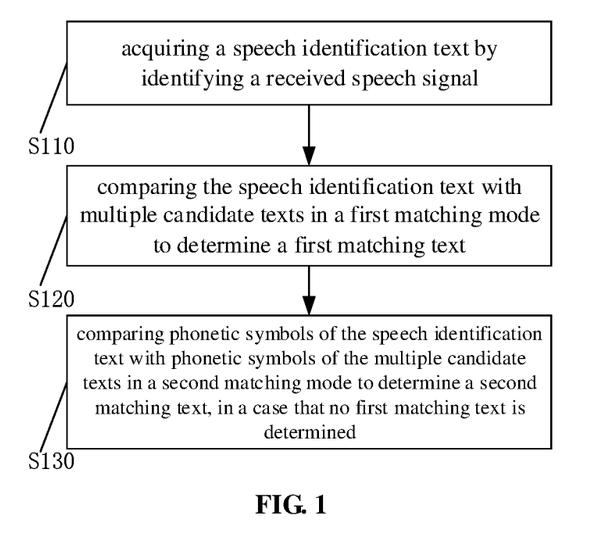
FIG. 1 is a flowchart of a method for matching a speech with a text according to an embodiment of the present application.

FIG. 1 is a flowchart of a method for matching a speech with a text according to an embodiment of the present application. The method for matching a speech with a text according to an embodiment of the present application includes S110 to S130.

At S110, a speech identification text is acquired by identifying a received speech signal.

For example, in a scenario of speech identification during a game, a user's speech instruction can be identified to control the current game character to start a corresponding action. For example, when a speech input from the user is "I want to crash my opponent", the speech input from the user may be identified and converted into a corresponding text.

At S120, the speech identification text is compared with multiple candidate texts in a first matching mode to determine a first matching text.

In an embodiment, the first matching mode is an exact matching mode. The exact matching mode may be adopted when the content of one of the multiple candidate texts can be found in the speech identification text. In an example, the exact matching mode may be implemented by using Python code, for example:

for k in select_list:
    if k in query:
        return k;

wherein, query represents the speech identification text, k represents one of the multiple candidate texts. In a case that one of the candidate texts is matched with the speech identification text, the matching is successful.

For example, action options of the current game character include: crash, flame fist, frozen fist, leaf fist. When the identified text is "I will crash the opponent", each of current options will be compared with the identified text. Since the "crash" can be matched exactly with the identified text, the matching succeeds. In a case that the identified text is "huyanzu", the exact matching mode fails.

In one embodiment, the matched candidate text is output, when the exact matching mode succeeds.

At S130, phonetic symbols of the speech identification text are compared with phonetic symbols of the multiple candidate texts in a second matching mode to determine a second matching text, in a case that no first matching text is determined.

Figure 2:
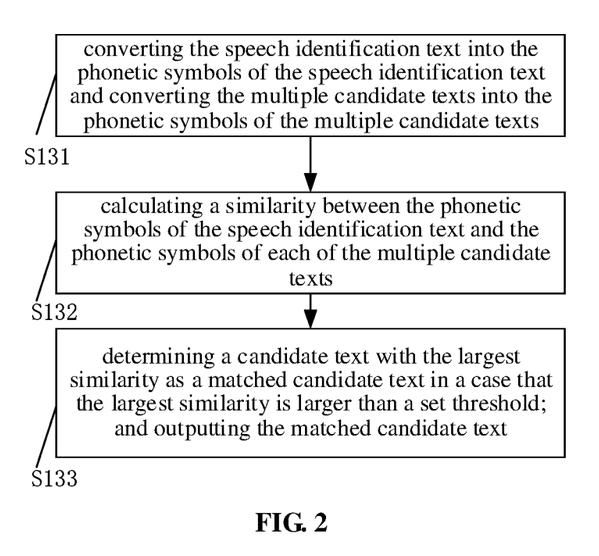
FIG. 2 is a specific flowchart of S130 according to an embodiment of the present application.

In one implementation, the second matching mode may be a phonetic fuzzy matching mode. In one implementation, comparing phonetic symbols of the speech identification text with phonetic symbols of the multiple candidate texts in a second matching mode to determine a second matching text includes S131 to S133.

At S131: the speech identification text is converted into the phonetic symbols of the speech identification text, and the multiple candidate texts are converted into the phonetic symbols of the multiple candidate texts.

For example, the speech identification text is "Yanzu HU", and the candidate texts are "crash", "flame fist", "frozen fist", "leaf fist". The speech identification text "Yanzu HU" is converted into "huyanzu" in Chinese Pinyin, the candidate texts "crash", "flame fist", "frozen fist", "leaf fist" are converted into "chongzhuang", "huoyanquan", "bingdongquan", "shuyequan" in Chinese Pinyin, respectively.

At S132, a similarity between the phonetic symbols of the speech identification text and the phonetic symbols of each of the multiple candidate texts is calculated.

In one implementation, a similarity between the phonetic symbols of the speech identification text and the phonetic symbols of each of the multiple candidate texts is calculated by a following formula:

$$\text{similarity} = \frac{LCS(s, q)}{len(s)},$$

where s represents phonetic symbols of one of the multiple candidate texts, q represents the phonetic symbols of the speech identification text, LCS(s, q) represents a length of the longest common sequence between the phonetic symbols of the one of the multiple candidate texts and the phonetic symbols of the speech identification text, len(s) represents a length of the phonetic symbols of the one of the multiple candidate texts.

For example, the longest common sequence between "huyanzu" and "chongzhuang" in Chinese Pinyin is "huan", and the length thereof is 4, that is, LCS(huyanzu, chongzhuang)=4. And the length of "chongzhuang", that is, len(chongzhuang)=11. So the similarity between "huyanzu" and "chongzhuang" in Chinese Pinyin is 4/11=0.36.

Similarly, LCS (huyanzu, huoyanquan)=6, len (huoyanquan)=10, the similarity between "huyanzu" and "huoyanquan" in Chinese Pinyin is 6/10=0.6.

LCS (huyanzu, bingdongquan)=3, len (bingdongquan)=12, the similarity between "huyanzu" and "bingdongquan" in Chinese Pinyin is 3/12=0.25.

LCS (huyanzu, shuyequan)=5, len (shuyequan)=9, the similarity between "huyanzu" and "shuyequan" in Chinese Pinyin is 5/9=0.55.

S133: a candidate text with the largest similarity is determined as a matched candidate text in a case that the largest similarity is larger than a set threshold; and the matched candidate text is output.

For example, the similarity between "Yanzu HU" and "flame fist" is the largest, so "flame fist" is selected first. Then it needs to be determined whether the similarity between "Yanzu HU" and "flame fist" is greater than the set threshold. For example, the threshold can be set as 0.5. Since the similarity between "Yanzu HU" and "flame fist" is 0.6, and greater than 0.5, the matching is successful.

In one implementation, the matched candidate text is output when the phonetic fuzzy matching mode is successful.

Figure 3:
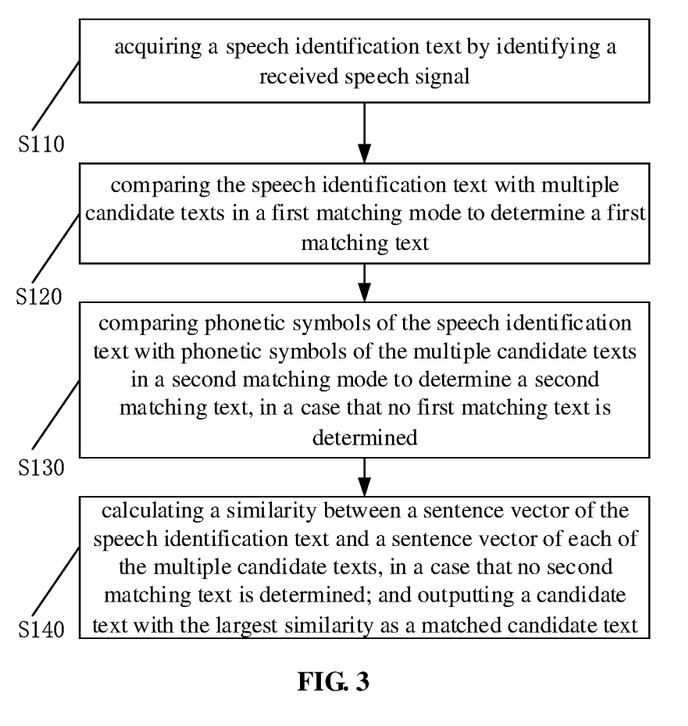
FIG. 3 is a flowchart of a method for matching a speech with a text according to another embodiment of the present application.

In another embodiment, as shown in FIG. 3, the method further includes S140.

At S140, a similarity between a sentence vector of the speech identification text and a sentence vector of each of the multiple candidate texts is calculated, in a case that no second matching text is determined; and a candidate text with the largest similarity is output as a matched candidate text.

For example, the candidate texts are "eat tomato", "eat cake", and the speech identification text is "feed love apple". In the exact matching mode, there is no match. In phonetic fuzzy matching mode, phonetic symbols of "eat tomato" and "feed love apple" are "chifanqie" and "weixihongshi" in Chinese Pinyin, the longest common sequence is "ini", the length of the longest common sequence is 3, and the length of the candidate text "eat tomato" is 9. The similarity between "feed love apple" and "eat tomato" (i.e., between "weixihongshi" and "chifanqie" in Chinese Pinyin) is 0.333. Similarly, the similarity between "feed love apple" and "eat cake" (i.e., between "weixihongshi" and "chidangao" in Chinese Pinyin) is 3/9, that is, 0.333. Since neither of the two similarities reaches the threshold of 0.5, then the sentence vector matching is perform.

Figure 4:
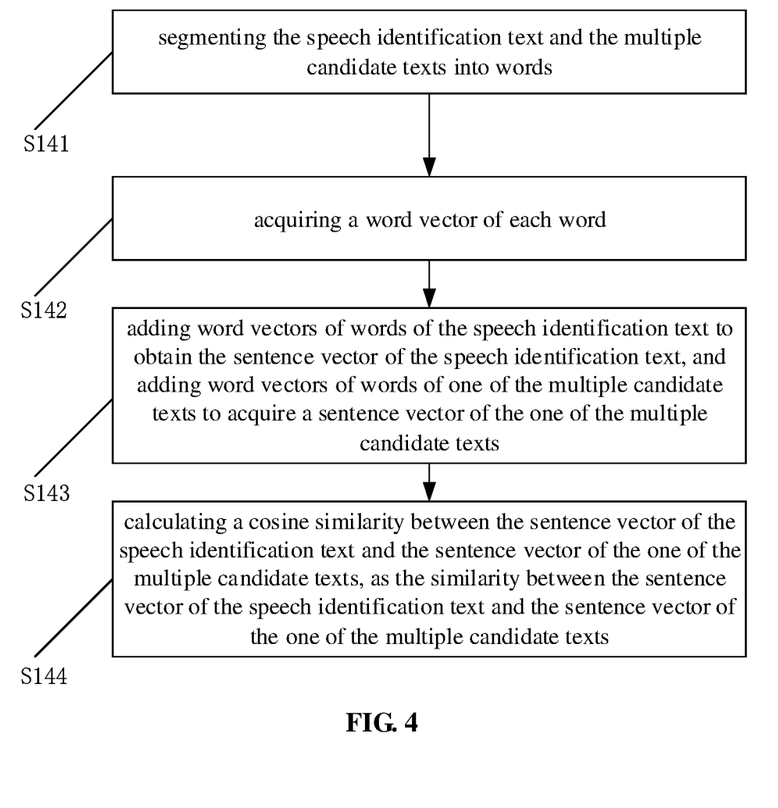
FIG. 4 is a specific flowchart of S140 according to another embodiment of the present application.

In one implementation, calculating a similarity between a sentence vector of the speech identification text and a sentence vector of each of the multiple candidate texts may include S141 to S144.

At S141, the speech identification text and the multiple candidate texts are segmented into words.

Firstly, one candidate text "eat tomato" is segmented into "eat" and "tomato", the other candidate text "eat cake" is segmented into "eat" and "cake", and the speech identification text "feed love apple" is segmented into "feed", "love apple".

At S142, a word vector of each word is acquired.

The word vector may refer to a vector representation of a word, that is, a word may correspond to a vector. For similar words, the corresponding word vectors are similar. There are many mature algorithms to calculate a word vector, such as a statistical language model, a neural network probability language model and a deep learning model. An appropriate word vector may be obtained by training a large number of text corpuses. In one implementation, for example, a word vector representation of a Baidu AI open platform can be directly used, with an output of 1024 dimensions.

For example, if two-dimensional vectors are used to represent the words mentioned above, the word vector of "eat" is (0.3, 0), the word vector of "tomato" is (0.3, 0.5), the word vector of "cake" is (0.6, 0.2), the word vector of "feed" is (0.32, 0.04), and the word vector of "love apple" is (0.32, 0.48).

At S143, word vectors of words of the speech identification text are added to obtain the sentence vector of the speech identification text, and word vectors of words of one of the multiple candidate texts are added to acquire a sentence vector of the one of the multiple candidate texts.

For example, the sentence vector of "eat tomato" is (0.3+0.3, 0+0.5)=(0.6, 0.5).

The sentence vector of "eat cake" is (0.3+0.6, 0+0.2)=(0.9, 0.2).

The sentence vector of "feed love apple" is (0.32+0.32, 0.04+0.48)=(0.64, 0.52).

At S144, a cosine similarity between the sentence vector of the speech identification text and the sentence vector of the one of the multiple candidate texts is calculated, as the similarity between the sentence vector of the speech identification text and the sentence vector of the one of the multiple candidate texts.

For example, the cosine similarity between the sentence vector of "feed love apple" and the sentence vector of "eat tomato" is calculated as the similarity, by $$\cos\theta_1 = \frac{a \cdot b}{|a| \cdot |b|} = \frac{0.64 \times 0.6 + 0.52 \times 0.5}{\sqrt{0.64^2 + 0.52^2} \times \sqrt{0.6^2 + 0.5^2}} = 0.9999.$$

And the cosine similarity between the sentence vector of "feed love apple" and the sentence vector of "eat cake" is calculated as the similarity, by $$\cos\theta_1 = \frac{a \cdot b}{|a| \cdot |b|} = \frac{0.64 \times 0.9 + 0.52 \times 0.2}{\sqrt{0.64^2 + 0.52^2} \times \sqrt{0.9^2 + 0.2^2}} = 0.8944$$

Since the similarity between "feed love apple" and "eat tomato" is larger, the candidate text "eat tomato" is output.

Figure 5:
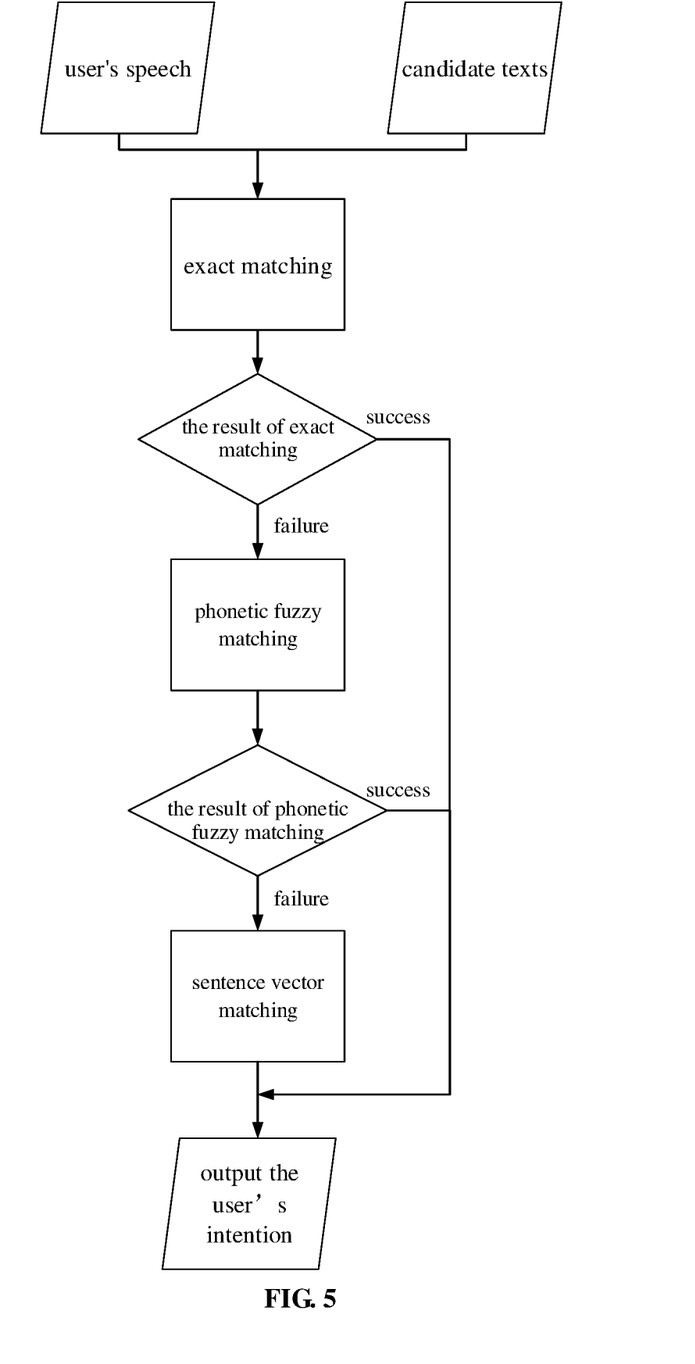
FIG. 5 is an overall flowchart of a method for matching a speech with a text according to an embodiment of the present application.

FIG. 5 is an overall flowchart of a method for matching a speech with a text according to an embodiment of the present application. Firstly, the user's input speech and the candidate texts are received. Then, exact matching is performed. When the exact matching is successful, the matched candidate text is output. In a case that the exact matching is unsuccessful, the phonetic fuzzy matching is performed, and when the phonetic fuzzy matching is successful, the matched candidate text is output. In a case that the phonetic fuzzy matching is unsuccessful, the sentence vector matching is performed, and finally a candidate text with the largest matching degree is output.

In the embodiment of the present application, by performing exact matching and phonetic fuzzy matching in sequence, the matching speed can be accelerated, and the smoothness of the speech interaction process can be improved.

Further, the semantic similarity matching can be performed, in the case where the exact matching and the phonetic fuzzy matching fail, so that the true intention of the user can be more accurately matched.

Figure 6:
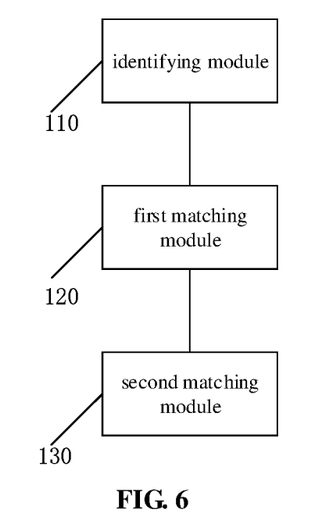
FIG. 6 is a connection block diagram of a device for matching a speech with a text according to an embodiment of the present application.

As shown in FIG. 6, a device for matching a speech with a text is provided according to another embodiment of the present application, includes:

an identifying module 110, configured to acquire a speech identification text by identifying a received speech signal;

a first matching module 120, configured to compare the speech identification text with multiple candidate texts in a first matching mode to determine a first matching text; and a second matching module 130, configured to compare phonetic symbols of the speech identification text with phonetic symbols of the multiple candidate texts in a second matching mode to determine a second matching text, in a case that no first matching text is determined.

Figure 7:
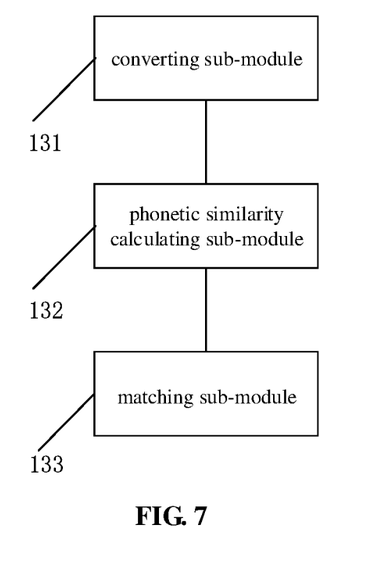
FIG. 7 is a connection block diagram of a second matching module according to an embodiment of the present application.

As shown in FIG. 7, the second matching module 130 includes:

a converting sub-module 131, configured to convert the speech identification text into the phonetic symbols of the speech identification text and convert the multiple candidate texts into the phonetic symbols of the multiple candidate texts;

a phonetic similarity calculating sub-module 132, configured to calculate a similarity between the phonetic symbols of the speech identification text and the phonetic symbols of each of the multiple candidate texts.

In one implementation, the phonetic similarity calculating sub-module 132 is configured to calculate a similarity between the phonetic symbols of the speech identification text and the phonetic symbols of each of the multiple candidate texts by a following formula:

$$similarity = \frac{LCS(s, q)}{len(s)},$$

where s represents phonetic symbols of one of the multiple candidate texts, q represents the phonetic symbols of the speech identification text, LCS(s, q) represents a length of the longest common sequence between the phonetic symbols of the one of the multiple candidate texts and the phonetic symbols of the speech identification text, len(s) represents a length of the phonetic symbols of the one of the multiple candidate texts.

The second matching module 130 further includes: a matching sub-module 133, configured to determine a candidate text with the largest similarity as a matched candidate text in a case that the largest similarity is larger than a set threshold; and output the matched candidate text.

Figure 8:
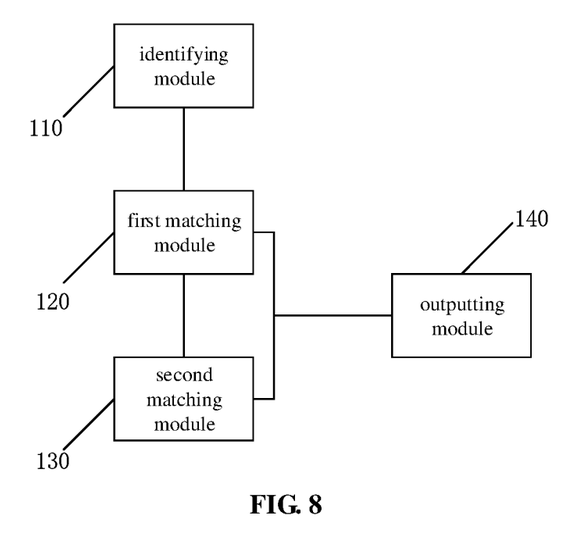
FIG. 8 is a connection block diagram of a device for matching a speech with a text according to another embodiment of the present application.

As shown in FIG. 8, the device further includes:

an outputting module 140, configured to output the first matching text as a matched candidate text, in a case that the first matching text is determined; and output the second matching text as the matched candidate text, in a case that the second matching text is determined.

Figure 9:
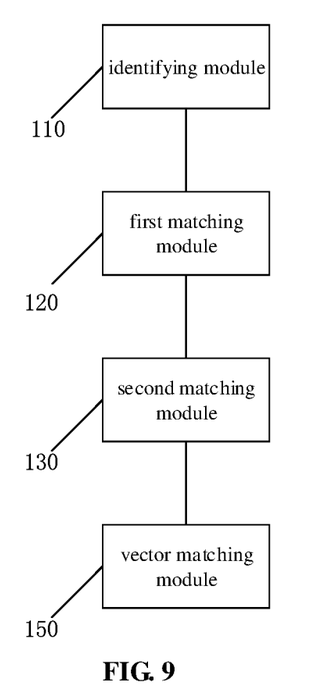
FIG. 9 is a connection block diagram of a device for matching a speech with a text according to another embodiment of the present application.

As shown in FIG. 9, the device further includes:

a vector matching module 150, configured to calculate a similarity between a sentence vector of the speech identification text and a sentence vector of each of the multiple candidate texts, in a case that no second matching text is determined; and output a candidate text with the largest similarity as a matched candidate text.

Figure 10:
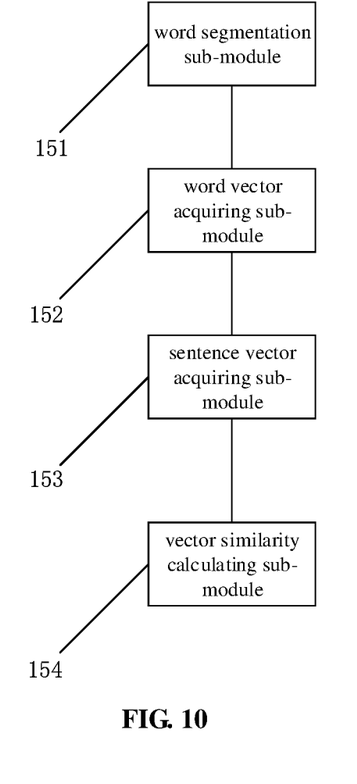
FIG. 10 is a connection block diagram of a vector matching module according to an embodiment of the present application.

As shown in FIG. 10, the vector matching module includes:

a word segmentation sub-module 151, configured to segment the speech identification text and the multiple candidate texts into words;

a word vector acquiring sub-module 152, configured to acquire a word vector of each word;

a sentence vector acquiring sub-module 153, configured to add word vectors of words of the speech identification text to obtain the sentence vector of the speech identification text, and add word vectors of words of one of the multiple candidate texts to acquire a sentence vector of the one of the multiple candidate texts;

a vector similarity calculating sub-module 154, configured to calculate a cosine similarity between the sentence vector of the speech identification text and the sentence vector of the one of the multiple candidate texts, as the similarity between the sentence vector of the speech identification text and the sentence vector of the one of the multiple candidate texts.

In this embodiment, functions of modules in the device refer to the corresponding description of the above mentioned method and thus the description thereof is omitted herein.

Figure 11:
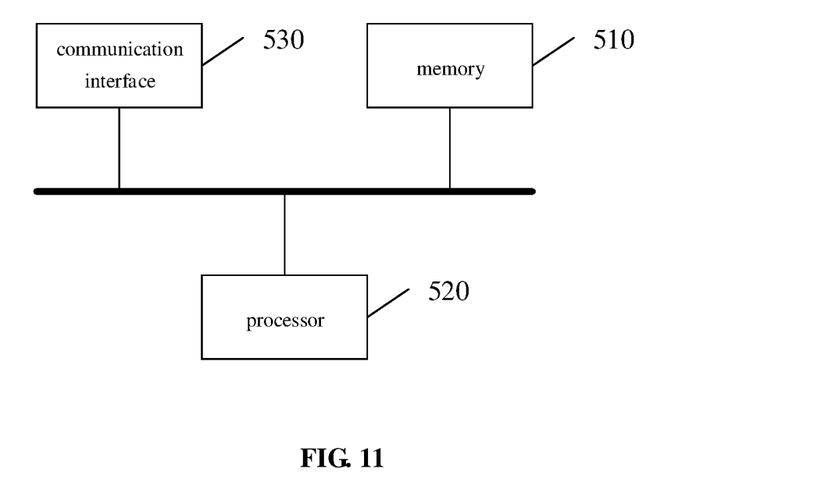
FIG. 11 is a block diagram of a device for matching a speech with a text according to another embodiment of the present application.

As shown in FIG. 11, a device for matching a speech with a text is provided according to another embodiment of the present application, including: a memory 510 and a processor 520. The memory 510 stores a computer program executable on the processor 520. When the processor 520 executes the computer program, the method in the foregoing embodiment is implemented. The number of the memory 510 and the processor 520 may be one or more.

The device further includes:

a communication interface 530 configured to communicate with an external device and exchange data.

The memory 510 may include a high-speed RAM memory and may also include a non-volatile memory, such as at least one magnetic disk memory.

If the memory 510, the processor 520, and the communication interface 530 are implemented independently, the memory 510, the processor 520, and the communication interface 530 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 11, but it does not mean that there is only one bus or one type of bus.

Optionally, in a specific implementation, if the memory 510, the processor 520, and the communication interface 530 are integrated on one chip, the memory 510, the processor 520, and the communication interface 530 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of some embodiments of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus.

The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

In an embodiment of the present application, a computer readable signal medium may include a data signal propagating in a baseband or as part of a carrier, carrying computer readable program code. Such propagated data signals can take a variety of forms including, but not limited to, electromagnetic signals, optical signals, or any suitable combination of the above. The computer readable signal medium can also be any computer readable medium other than a computer readable storage medium, which can transmit, propagate, or transport a program for use in or in connection with an instruction execution system, an input method, or a device. Program code embodied on a computer readable medium can be transmitted by any suitable medium, including but not limited to wireless, wire, optical cable, radio frequency (RF), and the like, or any suitable combination of the above.

It should be understood that various portions of some embodiments of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for matching a speech with a text, comprising:
   acquiring a speech identification text by identifying a received speech signal;
   comparing the speech identification text with multiple candidate texts in a first matching mode to determine a first matching text; and
   comparing phonetic symbols of the speech identification text with phonetic symbols of the multiple candidate texts in a second matching mode to determine a second matching text, in response to not determining the first matching text,
   wherein comparing phonetic symbols of the speech identification text with phonetic symbols of the multiple candidate texts in the second matching mode to determine the second matching text comprises:
      converting the speech identification text into the phonetic symbols of the speech identification text and converting the multiple candidate texts into the phonetic symbols of the multiple candidate texts;
      calculating a similarity between the phonetic symbols of the speech identification text and the phonetic symbols of each of the multiple candidate texts; and
      determining a candidate text with a largest similarity as a matched candidate text in response to determining that the largest similarity is larger than a set threshold; and
   outputting the matched candidate text,
   wherein calculating the similarity between the phonetic symbols of the speech identification text and the phonetic symbols of each of the multiple candidate texts is by the following formula:

$$\text{similarity} = \frac{LCS(s, q)}{len(s)}$$

wherein s represents phonetic symbols of one of the multiple candidate texts, q represents the phonetic symbols of the speech identification text, LCS(s, q) represents a length of a longest common sequence between the phonetic symbols of the one of the multiple candidate texts and the phonetic symbols of the speech identification text, len(s) represents a length of the phonetic symbols of the one of the multiple candidate texts.

2. The method according to claim 1, further comprising:
outputting the first matching text as a matched candidate text, in response to determining the first matching text; and
outputting the second matching text as the matched candidate text, in response to determining the second matching text.

3. The method according to claim 1, further comprising:
calculating a similarity between a sentence vector of the speech identification text and a sentence vector of each of the multiple candidate texts, in response to not determining the second matching text; and outputting a candidate text with a largest similarity as a matched candidate text.

4. The method according to claim 3, wherein the calculating a similarity between a sentence vector of the speech identification text and a sentence vector of each of the multiple candidate texts comprises:
segmenting the speech identification text and the multiple candidate texts into words;
acquiring a word vector of each word;
adding word vectors of words of the speech identification text to obtain the sentence vector of the speech identification text, and adding word vectors of words of one of the multiple candidate texts to acquire a sentence vector of the one of the multiple candidate texts; and
calculating a cosine similarity between the sentence vector of the speech identification text and the sentence vector of the one of the multiple candidate texts, as the similarity between the sentence vector of the speech identification text and the sentence vector of the one of the multiple candidate texts.

5. A device for matching a speech with a text, comprising:
one or more processors; and
a storage device configured to store one or more programs, that, when executed by the one or more processors, cause the one or more processors to:
acquire a speech identification text by identifying a received speech signal;
compare the speech identification text with multiple candidate texts in a first matching mode to determine a first matching text; and
compare phonetic symbols of the speech identification text with phonetic symbols of the multiple candidate texts in a second matching mode to determine a second matching text, in response to not determining the first matching text,
wherein the one or more programs, when executed by the one or more processors, cause the one or more processors further to:
convert the speech identification text into the phonetic symbols of the speech identification text and convert the multiple candidate texts into the phonetic symbols of the multiple candidate texts;
calculate a similarity between the phonetic symbols of the speech identification text and the phonetic symbols of each of the multiple candidate texts;

determine a candidate text with a largest similarity as a matched candidate text in response to determining that the largest similarity is larger than a set threshold; and
output the matched candidate text,
wherein the similarity between the phonetic symbols of the speech identification text and the phonetic symbols of each of the multiple candidate texts is calculated by the following formula:

$$\text{similarity} = \frac{LCS(s, q)}{len(s)}$$

wherein s represents phonetic symbols of one of the multiple candidate texts, q represents the phonetic symbols of the speech identification text, $LCS(s, q)$ represents a length of a longest common sequence between the phonetic symbols of one of the multiple candidate texts and the phonetic symbols of the speech identification text, len(s) represents a length of the phonetic symbols of the one of the multiple candidate texts.

6. The device according to claim 5, wherein the one or more programs, when executed by the one or more processors, cause the one or more processors further to:
output the first matching text as a matched candidate text, in response to determining the first matching text; and
output the second matching text as the matched candidate text, in response to determining the second matching text.

7. The device according to claim 5, wherein the one or more programs, when executed by the one or more processors, cause the one or more processors further to:
calculate a similarity between a sentence vector of the speech identification text and a sentence vector of each of the multiple candidate texts, in response to not determining the second matching text; and
output a candidate text with a largest similarity as a matched candidate text.

8. The device according to claim 7, wherein the one or more programs, when executed by the one or more processors, cause the one or more processors further to:
segment the speech identification text and the multiple candidate texts into words;
acquire a word vector of each word;
add word vectors of words of the speech identification text to obtain the sentence vector of the speech identification text, and add the word vectors of words of one of the multiple candidate texts to acquire a sentence vector of the one of the multiple candidate texts; and
calculate a cosine similarity between the sentence vector of the speech identification text and the sentence vector of the one of the multiple candidate texts, as the similarity between the sentence vector of the speech identification text and the sentence vector of the one of the multiple candidate texts.

9. A non-transitory computer-readable storage medium, in which a computer program is stored, wherein the computer program, when executed by a processor, causes the processor to implement the method of claim 1.

* * * * *